INVENTOR
Francis Albert Garrett
BY
ATTORNEY

Patented Oct. 1, 1935

2,016,087

UNITED STATES PATENT OFFICE 2,016,087

CONTROL GEAR FOR ELECTRICALLY DRIVEN VEHICLES

Francis Albert Garrett, Leyland, England, assignor to Leyland Motors Limited, Leyland, England, a company of Great Britain Application February 27, 1934, Serial No. 713,242
In Great Britain March 1, 1933

5 Claims. (Cl. 172—179)

This invention relates to electrically driven vehicles taking their supply from an overhead conductor and controlled by a system of contactors; and especially to trolley omnibuses, tramcars and like vehicles.

The contactor-type control gear commonly employed upon such vehicles includes a number of contactors which connect the motor or motors to line, effect changes in the connections of the motors, and successively cut out segments of resistance from the motor circuit; together with a drum type controller which completes the circuit of the several contactor magnets as it is turned from one position to another.

It sometimes happens that the supply from the overhead conductor is interrupted more or less completely over a short length of road by the accumulation of sleet or snow upon the conductor. The consequence is that all the contactors are deenergized and break their contacts, and the vehicle slows up owing to the failure of power. But if the drum controller is left upon an advanced notch, so soon as contact is re-established between the trolley and the overhead conductor all the contactors formerly excited are suddenly re-excited, and a considerable surge of current may pass through the motor.

To obviate this according to the present invention the line contactors and if desired one or more of the resistance contactors are energized, not from the overhead conductor, but from an independent source, for instance a battery carried on the vehicle, or the usual low voltage generator employed for lighting the vehicle; and means are provided for preventing the contactors operated from the overhead conductor from coming in either too rapidly or at all. For example the circuit of the high voltage contactors may include a contact of a relay which is initially excited only on the first controller notch or first two notches, and thereafter maintained by a holding circuit which it itself completes. Thus upon the overhead supply failing the motor circuit is brought to the condition corresponding with, say, the first or second notch of the controller, and so if the controller is held upon an advanced notch the restoration of the supply will not cause a greater or much greater acceleration than normal starting; and to increase the speed the driver must first return the controller to the "off" position or to the first or second notch, before current can be re-established to the high voltage contactors.

Alternatively the high voltage contactors may be allowed to re-excite on the supply being restored but only with a suitable time lag in the operation of each. Such lag may be brought about by a dash pot or any usual delay action device; or the contactor magnets may be fitted with opposing series coils which prevent their actuation so long as the motor current exceeds a predetermined value.

Diagrams of connections of systems embodying the invention are illustrated in the accompanying drawings.

The power circuit shown at the bottom of the diagram as extending from trolley collector T+ to trolley collector T— includes the usual overload release switches CS1, CS2, line switches LS1, LS2, constructed as contactors, the armature A and field F of the motor, and a suitable number of resistance segments $r^1$, $r^2$, etc. each with a contactor R1, R2, etc. for short-circuiting it.

Figure 1:
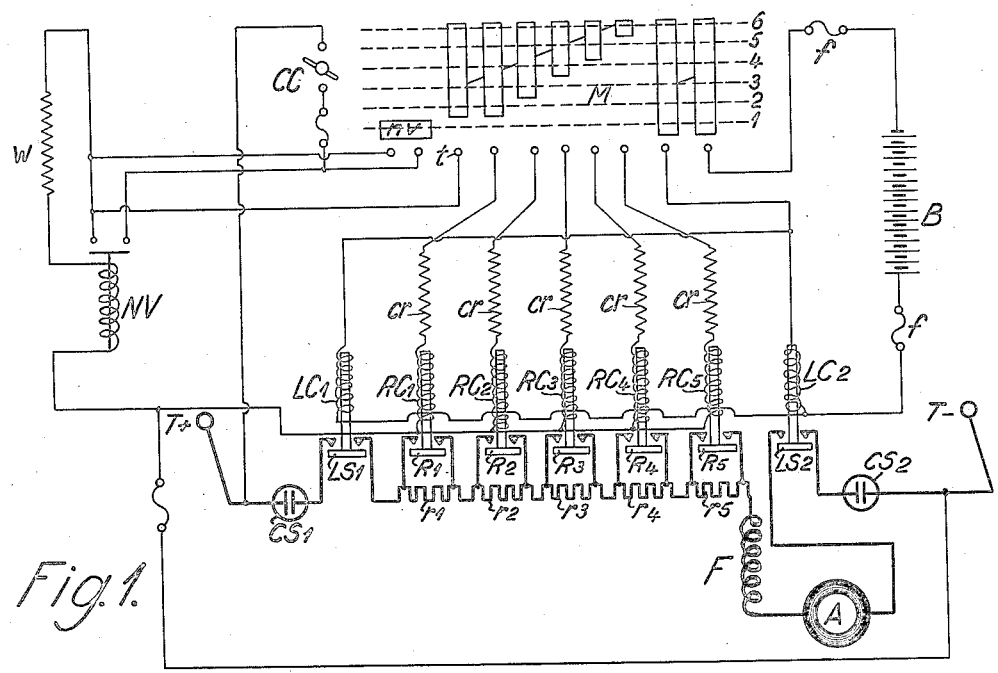
Figure 1 shows a system in which the line contactors alone are energized from a source independent of the overhead conductor.

The circuits of the contactor coils LC1, LC2, RC1 . . . RC5, are made and broken by a drum controller M, shown as having six notches in addition to its off position. But there are two separate sources of supply for these circuits. A battery B protected by fuses $f$, $f$ excites the parallel line switch coils LC1, LC2 when the drum controller is moved to its first notch. This completes the motor circuit, assuming the canopy switches CS1, CS2 have been closed, and starts the vehicle. The remaining contactor coils, in the system illustrated in Figure 1, are excited from the overhead supply, but not directly. It is first necessary to excite a no-volt relay NV, which is done by closing the control circuit switch CC, and bringing the drum controller M to its first notch. The exciting circuit is: Collector T+, control circuit switch CC, contact $nv$ of the controller M, a resistance $w$, relay NV, to collector T—. On excitation of relay NV its armature connects T+ to the brush $t$ of the controller M. As the controller is turned to the second, third and other notches, connections are made successively to the contactor coils RC1, RC2 etc. through resistances cr, and the contactor coils being connected in common to T— they are energized in succession, and therefore the resistances $r^1$, $r^2$, etc. are successively cut out of the motor circuit.

It will be understood that there is no novelty in the motor circuit and the steps by which it is modified, nor is the invention in any way limited to them. Any usual system may be employed.

If either of the trolley wheels fails to secure effective contact with the overhead conductor or for any other reason the power supply fails, relay NV is de-energized, thus disconnecting the contactor coils RC1 ... RC5 from the trolley collector. All the contactors therefore except LC1, LC2 are de-energized and the switches R1 ... R5 opened. When the power supply comes on again the motor circuit is in the condition corresponding with the first notch of the controller M, whatever may be the position of the controller, that is to say all the resistances $r^1$ ... $r^5$ are in circuit. They cannot be cut out except by first returning the controller to its first notch, upon which contact nv completes the circuit of relay NV which in turn connects brush t to T+.

Figure 2:
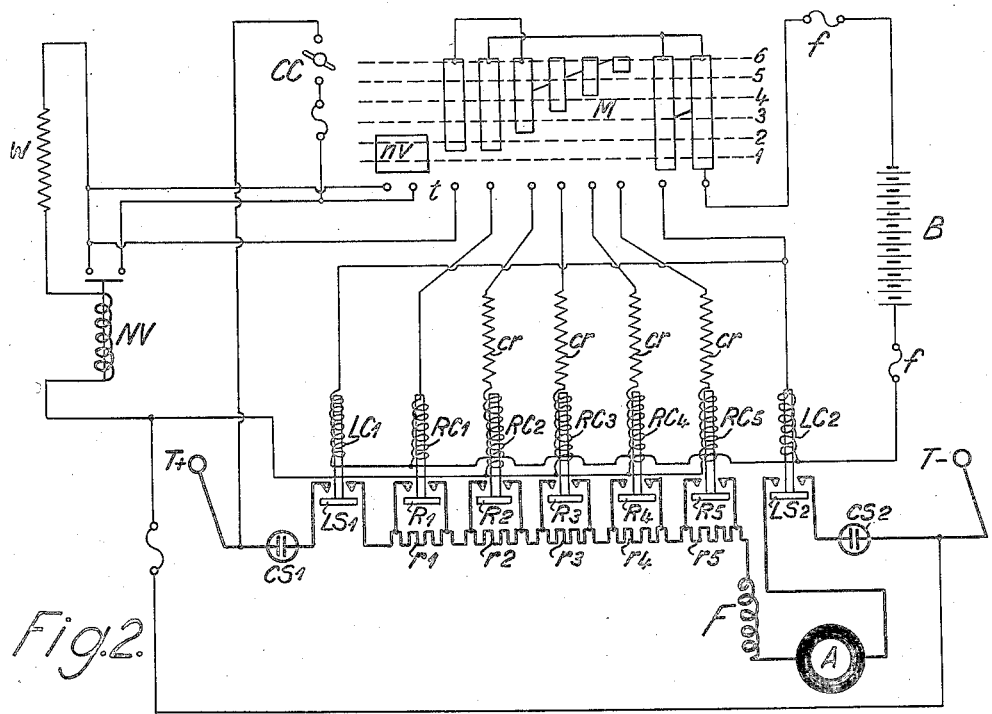
Figure 2 shows a system in which the line contactors and one of the resistance contactors are energized from a source independent of the overhead conductor.

It is not essential that only the line switches should be battery operated; if desired one or more of the resistance contactors may be so operated, in which case the contact nv would be extended to the second or later notch, and it would only be necessary to return the controller to this notch after an interruption. This is shown in Figure 2 where the resistance contactor RC1 is battery-operated, and the contact nv is extended to notch 2.

Figure 3:
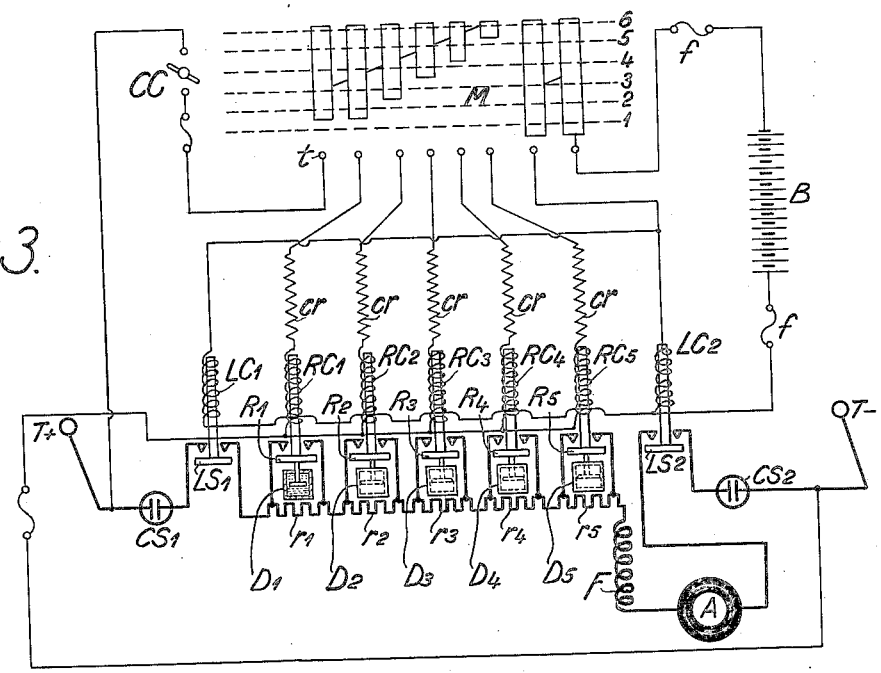
Figure 3 shows a system in which contactors excited from the mains are allowed to re-excite upon restoration of the mains connection under the control of dash pots.

In Figure 3 the no-volt relay NV and its controller contact nv are dispensed with, and whatever contactors were in circuit on the supply being interrupted are allowed to re-excite upon its restoration, but only with a suitable time lag in the operation of each brought about by a delay action device shown as a dash pot D1, ... D5. These are adjusted to give each a greater delay than the preceding dash pot, D1 giving the least and D5 the greatest delay.

Figure 4:
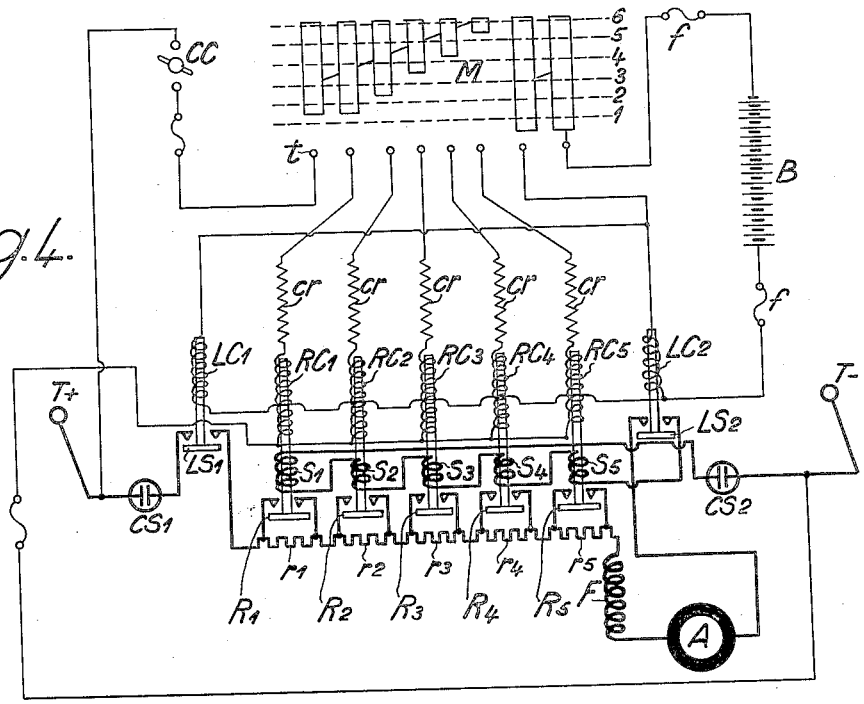
Figure 4 is a system in which the re-excitation of the contactors on restoration of the supply is delayed by series windings.

Instead of employing dash pots each contactor magnet may be fitted with an opposing series coil as shown at S1 ... S5 in Figure 4. Upon restoration of the supply after an interruption each contactor is prevented from exciting until the current through the motor has fallen to such a value that the series excitation is overpowered by the excitation through the windings RC1 ... RC5.

I claim:
1. In an electrically driven vehicle the combination of an electric motor, means for collecting current from an external source, electromagnetically operated line switches for connecting said motor to the current-collecting means, electromagnetically operated speed-varying switches for varying the circuit of said motor to govern the vehicle speed, a local source of electricity upon the vehicle, and a controller governing the circuits of the switch electromagnets, said controller upon one notch connecting with the local source the electromagnets of the line switches, and upon succeeding notches connecting the electromagnets of the speed-varying switches in succession to the current collecting means.

2. In a vehicle the combination of electrical driving means, means for collecting current from an external source, line contactors for connecting said electrical driving means to the current collecting means, speed-varying contactors for varying the circuits of said electrical driving means to govern the vehicle speed, a local source of electricity upon the vehicle, and a controller governing the operating circuits of said contactors, and serving to connect some of said speed-varying contactors to the current collecting means and the remaining contactors to the local source.

3. In an electrically driven vehicle the combination of an electric motor, means for collecting current from overhead conductors, resistances, line contactors for connecting said motor to the current collecting means, resistance contactors for excluding said resistances from the circuit of said motor, a local source of electricty, a relay, a contact operated by said relay, a controller, circuits for said line contactors including contacts made by said controller on its first notch for exciting said line contactors from the local source, contacts made by said controller only upon its first notch for exciting said relay from the overhead conductors and exciting circuits for connecting said resistance contactors to the current-collecting means including, contacts made by said controller on its second and subsequent notches and the contact operated by said relay.

4. In a vehicle the combination of electrical driving means, means for collecting current from an external source, line contactors for connecting said electrical driving means to the current-collecting means, speed-varying contactors for varying the circuits of said electrical driving means to govern the vehicle speed, a local source of electricity upon the vehicle, a controller, operating circuits for some of said speed-varying contactors including contacts operated by said controller by which said contactors are connected with the current-collecting means, operating circuits for the remaining contactors including said local source and contacts operated by said controller, and means preventing re-excitation of contactors operated from said current-collecting means after failure of the external supply unless and until said controller is returned to an early notch.

5. In a vehicle the combination of electrical driving means, means for collecting current from an external source, line contactors for connecting said electrical driving means to the current-collecting means, speed-varying contactors for varying the circuits of said electrical driving means to govern the vehicle speed, a local source of electricity upon the vehicle, a controller, a relay, a contact operated by said relay, an exciting circuit for said relay including contacts made by said controller on an early notch and thereafter broken by which said relay is excited from the external source, operating circuits for some of said speed-varying contactors including contacts operated by said controller and the contact operated by said relay by which said contactors are connected with the current collecting means, and operating circuits for the remaining contactors including said local source and contacts operated by said controller.

FRANCIS ALBERT GARRETT.